March 24, 1970  K. M. ALLEN ET AL  3,502,196

ANNULAR ELEVATOR MECHANISMS

Filed Oct. 9, 1967  3 Sheets-Sheet 1

KENNETH M. ALLEN
CHESTER H. HARPER
*INVENTORS*

BY
BUCKHORN, BLORE, KLARQUIST & SPARKMAN

ATTORNEYS

March 24, 1970  K. M. ALLEN ET AL  3,502,196
ANNULAR ELEVATOR MECHANISMS

Filed Oct. 9, 1967  3 Sheets-Sheet 2

KENNETH M. ALLEN
CHESTER H. HARPER
*INVENTORS*

*BY*
BUCKHORN, BLORE, KLARQUIST & SPARKMAN
ATTORNEYS

March 24, 1970  K. M. ALLEN ET AL  3,502,196
ANNULAR ELEVATOR MECHANISMS

Filed Oct. 9, 1967  3 Sheets-Sheet 3

KENNETH M. ALLEN
CHESTER H. HARPER
*INVENTORS*

*BY*
BUCKHORN, BLORE, KLARQUIST & SPARKMAN
ATTORNEYS

United States Patent Office

3,502,196
Patented Mar. 24, 1970

3,502,196
ANNULAR ELEVATOR MECHANISMS
Kenneth M. Allen and Chester H. Harper, Newberg, Oreg., assignors to Allen-Harper, Inc., Newberg, Oreg., a corporation of Oregon
Filed Oct. 9, 1967, Ser. No. 673,736
Int. Cl. B65g 37/00, 29/00
U.S. Cl. 198—107                                     11 Claims

ABSTRACT OF THE DISCLOSURE

An annular trough 10 supported by a pair of rollers 12 for rotation on a horizontal axis is rotated by a drive roller 14 to carry fluent material in the lower portion of the trough upwardly to a deflector 16 fitting closely in and substantially filling the cross sectional area of the trough. The deflector scrapes the material from the trough 10 and the material falls into a trough-like conveyor 18. The conveyor 18 drops the material onto articles to be dusted with the material in a trough-like conveyor 20 which carries the articles through the lower portion of the trough 10 and drops excess fluent material through a screen portion 22 into the annular trough 10 for recycling. The rollers 12 are carried by spaced arcuate frame plates 24, and an arcuate, cupped cover 26 carries the roller 14 and an electric motor drive 28 therefor. The cover 26 is hinged relative to the frame plates 24 to provide access to the annular trough 10. An annular elevator mechanism 100 (FIGS. 5 and 6) includes annular troughs 109, 110 and 111 adapted to raise fluent material from the bottom of the lower trough 109 to the top of the uppermost trough 111 and deposit the material in a trough-like conveyor 118.

DESCRIPTION

This invention relates to annular elevator mechanisms, and more particularly to annular elevating trough mechanisms.

An object of the invention is to provide annular elevators.

Another object of the invention is to provide annular elevating trough mechanisms.

A further object of the invention is to provide an elevator mechanism including an annular trough rotated on a horizontal axis to carry material from a lower point to a higher point for discharge at the higher point.

Another object of the invention is to provide an apparatus for dusting sugar on doughnuts including an annular trough receiving sugar from a lower conveyor having a screen and conveying the doughnuts, and raising the sugar, a deflector deflecting raised sugar from the trough into an upper conveyor which drops the sugar onto doughnuts on the lower conveyor.

Another object of the invention is to provide an elevator mechanism including a plurality of annular troughs at different levels and transfer means for transferring material from the upper portion of a lower one of the troughs to the lower portion of an upper trough.

The invention provides annular elevator mechanisms each including an annular trough rotated on a horizontal axis for carrying material from a lower portion of the trough to an upper portion of the trough. A mechanism forming one specific embodiment of the invention includes an annular trough rotated on a horizontal axis, receiving material in the lower portion thereof from a lower conveyor, raising the material to the upper portion thereof and having the raised material removed therefrom and deposited on an upper conveyor which dusts the material on articles carried by the lower conveyor. In annular elevator mechanism forming an alternate embodiment of the invention, a plurality of overlapping annular troughs at different levels are rotated on horizontal axes and material raised by a lower one of the troughs is deposited in a lower portion of an upper one of the troughs.

A complete understanding of the invention may be obtained from the following detailed description of annular elevator mechanisms forming specific embodiments thereof, when read in conjunction with the appended drawings, in which.

Figure 1:
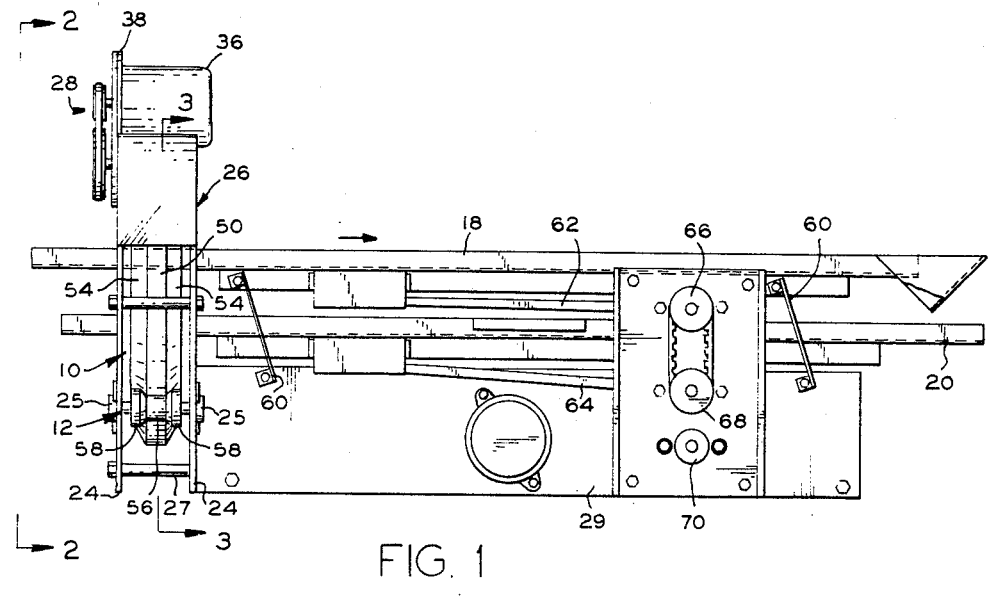
FIG. 1 is a side elevation view of an annular elevator mechanism forming one embodiment of the invention.

Referring now in detail to the drawings, an annular elevator mechanism shown in FIGS. 1 to 4 and forming one embodiment of the invention includes an annular trough 10 and is adapted to dust powdered sugar on doughnuts and recycle excess sugar. The trough 10 is supported for rotation on a substantially horizontal axis by grooved friction rollers 12 and is rotated by a grooved drive roller 14. The sugar is a fluent material, being in powder form, and is carried by the trough 10 through friction and centrifugal force upwardly from the lower portion of the trough to the upper portion where adjustable cupped or scoop-like deflectors or scrapers 16 and 17 fitting closely in and substantially filling the central portion of the cross-sectional area of the trough scoops the sugar from the trough and guides the sugar into an upper conveyor 18 having a perforated or screen-like bottom. The conveyor 18 conveys the sugar to the right as viewed in FIG. 1, drops some of the sugar onto doughnuts on a lower conveyor 20, and drops the remaining sugar onto a spreading deflector 19. The conveyor 20 carries the sugar dusted doughnuts and the excess sugar to the left to a perforated or screen portion 22, over the lower portion of the annular trough 10, and the excess sugar is dropped for recycling through the screen portion into the upwardly facing lower portion of the trough 10 while the sugar dusted doughnuts are conveyed on to suitable receiving means (not shown).

Figure 2:
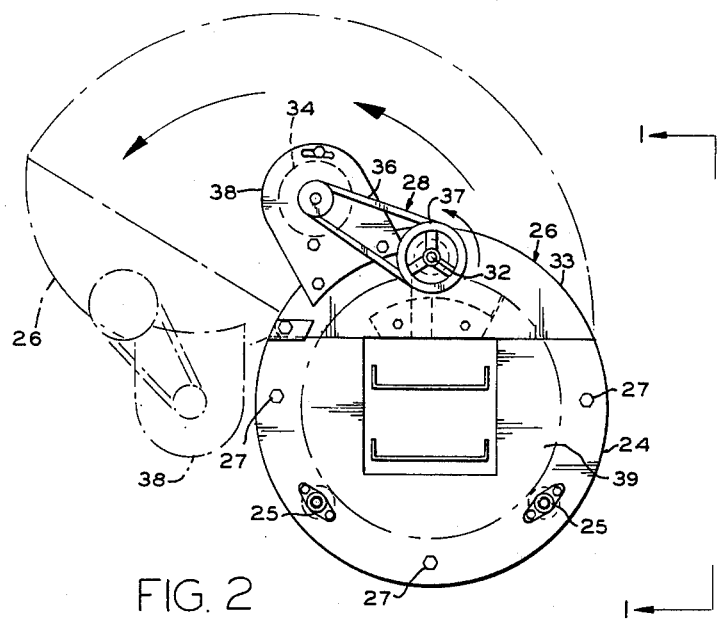
FIG. 2 is an elevation view taken along line 2—2 of FIG. 1.
Figure 3:
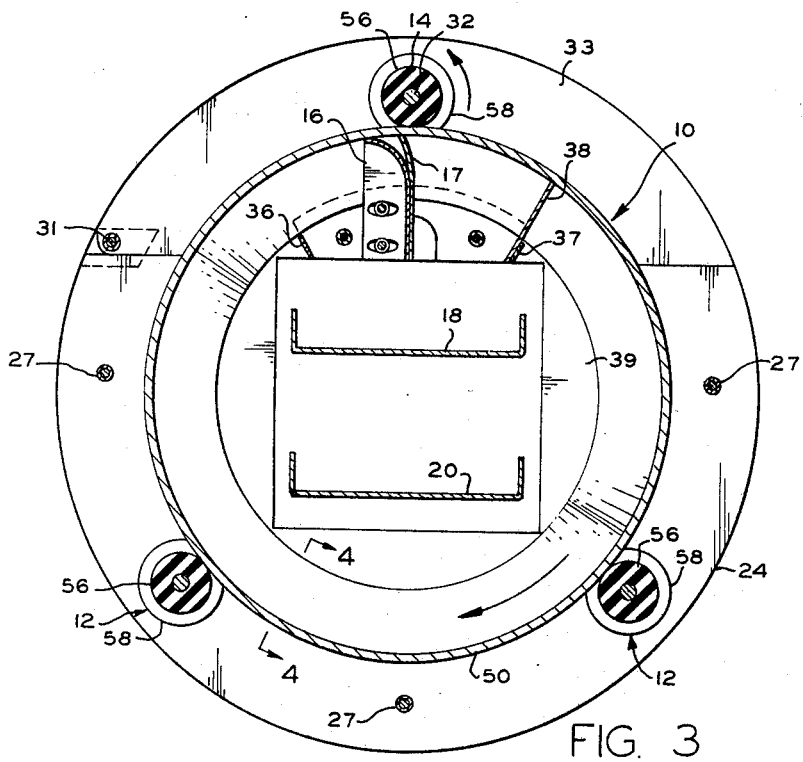
FIG. 3 is an enlarged vertical sectional view taken along line 3—3 of FIG. 1.
Figure 4:
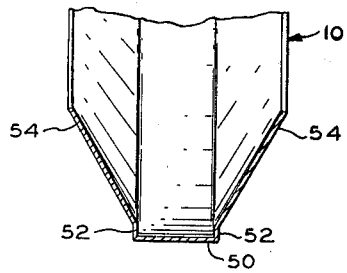
FIG. 4 is an enlarged vertical sectional view taken along line 4—4 of FIG. 3.

The rollers 12 are carried by axles 23 carried by disc-like frame plates 24 through bearings 25 (FIGS. 1 and 2). Tie rod and spacer structures 27 secure the plates 24 in fixed positions with one of the plates being secured rigidly to a base 29 of the mechanism. An arcuate, cupped cover 26 hinged to a rod 31 carried by the plates 24 carries the drive roller 14 by means of a shaft 32 keyed to the roller 14 and journaled on chordal segment side plates 33 of the cover 26. An electric motor drive 28 also is carried by the cover 26, and includes an electric motor 34, a drive pulley 35, a belt 36 and a driven pulley 37 keyed to the shaft 32, the weight of these elements serving to press the roller 14 against the trough. The motor is carried by a mounting plate 38 bolted to the cover. The cover 26 with the roll 14 and the drive 28 may be swung from the operating positions thereof shown in full lines in FIG. 2 to the open position thereof shown in broken lines in FIG. 2 to provide access to the trough 10 and the deflector 16. Plates 36 and 37 bracket the deflector 16, and, with a secondary deflector 38 fitting closely in the trough, guide the sugar into the conveyor 18. The plates 36, 37 and 38 are carried by a transverse frame member 39 secured to the base 29.

The trough 10 includes a cylindrical peripheral portion 50 (FIG. 4), parallel, narrow, annular side members 52 and wide, frustoconical, inwardly opening inner side members 54, and preferably is of an aluminum sheet formed by spinning. The rollers 12 and 14 have reduced central portions 56 (FIG. 3), each of a length slightly greater than the width of the peripheral portion 50, and also have tapered flange portions 58 closely confining the trough 10 therebetween.

The conveyors 18 and 20 are supported for vibratory motion by resilient struts illustrated by struts 60 (FIG. 1) secured to the conveyors and to the base 29. The conveyors are driven 180° out of phase by connecting rods 62 and 64 driven by crank drives 66 and 68 driven by an electric motor drive 70 carried by the base 29.

EMBODIMENT OF FIGS. 5 AND 6

Figure 5:
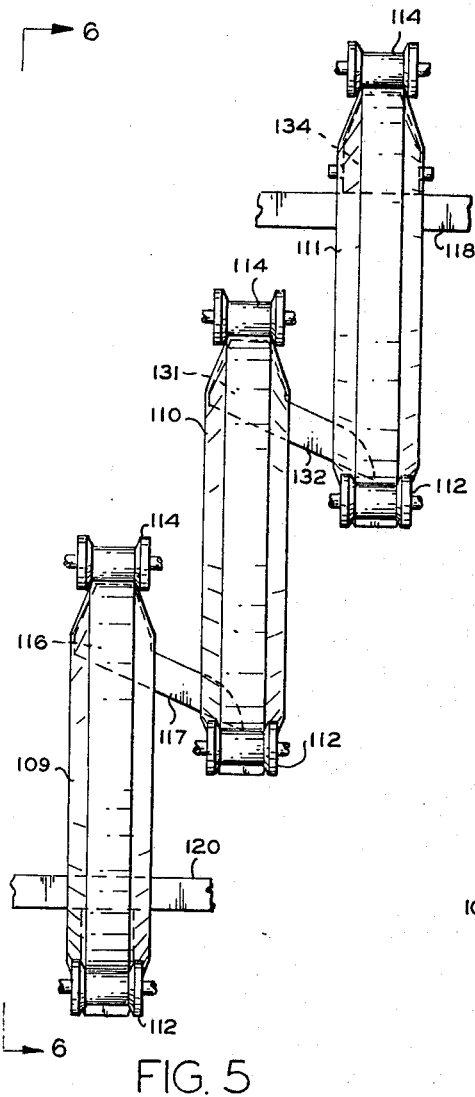
FIG. 5 is a side elevation view of an annular elevator mechanism forming an alternate embodiment of the invention.
Figure 6:
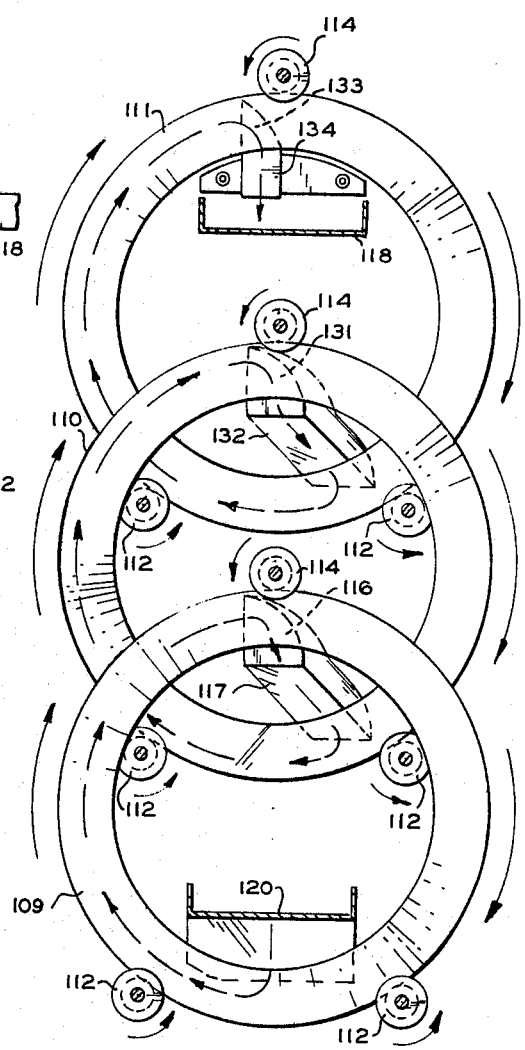
FIG. 6 is an elevation view taken along line 6—6 of FIG. 5.

An annular elevator mechanism forming an alternate embodiment of the invention and shown in FIGS. 5 and 6 includes a series of three vertically spaced and horizontally offset annular troughs 109, 110 and 111 adapted to elevate fluent material from the trough 109 to a conveyor 118. The troughs 109, 110 and 111 are identical with the trough 10, are supported by rollers 112 like the rollers 12 and are driven by drive rollers 114 like the drive roller 14. The fluent material is dropped from a supply conveyors 120 into the lower portion of the trough 109, is raised by the trough 109, is deflected or scraped out of the trough 109 by a deflector 116 forming a part of a chute 117, is guided by the chute 117 into the lower portion of the trough 110, is elevated by the trough 110 to a deflector 131, is deflected by the deflector 131 to a chute 132, is guided by the chute 132 into the trough 111, is elevated by the trough 111, is scraped from the trough 111 by a deflector 133, and is guided by a chute 134 into the conveyor 118. The rollers 114 may be driven by separate drives (not shown) like the drive 28 or may be driven by a common drive (not shown). The speeds of rotation are sufficient to carry the fluent material by friction with the trough and between particles, with the speeds being high enough to create the necessary friction to prevent sliding back and down by centrifugal force.

The above-described annular elevator mechanisms occupy minimum space, have little power loss and are easily cleaned. The mechanisms work very well for many types of elevating uses and are especially desirable for those uses where recycling of the material conveyed is needed. The mechanisms are simple, rugged and efficient.

What is claimed is:

1. In an annular elevator mechanism,
   an annular inwardly opening trough having an unobstructed, continuous, trough-like passage,
   support means mounting the trough for rotation about its longitudinal axis,
   drive means for rotating the trough on its longitudinal axis,
   supply means for feeding material into the trough at one point in its rotational movement,
   and receiving means projecting into the trough at a second point in the rotational movement of the trough for deflecting material out of the trough at said second point in its rotational movement.

2. In an annular elevator mechanism,
   an annular, inwardly opening, substantially unobstructed trough,
   support means mounting the trough for rotation about its longitudinal axis,
   drive means for rotating the trough on its longitudinal axis,
   supply means for feeding material into the trough at one point in its rotational movement,
   and stationary receiving means projecting into the trough for deflecting material out of the trough at a second point in its rotational movement,
   the support means serving to mount the trough for rotation about a non-horizontal axis so that it is rotated along a path having a lower portion and an upper portion,
   the supply means serving to feed material into the portion of the trough in the lower portion of the path,
   the receiving means serving to deflect material out of the portion of the trough in the upper portion of the path.

3. The annular elevator mechanism of claim 2 wherein the supply means includes a lower conveyor member having a screening portion positioned over the lower portion of the trough.

4. The annular elevator mechanism of claim 3 wherein the receiving means includes a deflector and an upper conveyor member positioned below the deflector and adapted to convey material and discharge the material on the lower conveyor member.

5. The annular elevator mechanism of claim 2 wherein the support means comprises a pair of laterally spaced grooved rollers.

6. The annular elevator mechanism of claim 2 wherein the drive means comprises a grooved roller fitting on a portion of the trough and power means for rotating the roller.

7. The annular elevator mechanism of claim 6 wherein the drive roller is mounted floatingly on the upper portion of the trough and the power means is at least partially supported by and presses the drive roller downwardly against the trough.

8. The annular elevator mechanism of claim 7 including means pivotally mounting the drive means on the support means between a closed position covering the upper portion of the trough and an open position away from the upper portion of the trough.

9. The annular elevator mechanism of claim 2 wherein the trough includes a cylindrical peripheral portion and a pair of generally frustoconical side flange portions.

10. The annular elevator mechanism of claim 9 wherein the trough includes a pair of flat annular portions joining the outer edges of the flanges and the side edges of the peripheral portion.

11. In an annular elevator mechanism,
    an annular trough,
    means mounting the trough rotatably on a horizontal axis,
    means for rotating the trough on the horizontal axis,
    lower conveyor means having a portion adapted to discharge fluent material therefrom extending into the lower portion of the annular trough,
    upper conveyor means extending from the upper portion of the trough for supplying fluent material to articles on the lower conveyor means,
    and deflector means projecting into the upper portion of the trough for deflecting granular material from the trough to the upper conveyor means.

References Cited

UNITED STATES PATENTS 2,232,431    2/1941    Bilocq _____ 198—211

FOREIGN PATENTS 679,400    2/1964    Canada.
415,776    2/1924    Germany.

EDWARD A. SROKA, Primary Examiner

U.S. Cl. X.R.

118—312; 198—211